US012812360B2

(12) United States Patent
Rukmangathan et al.

(10) Patent No.: US 12,812,360 B2
(45) Date of Patent: Nov. 24, 2026

(54) METHODS AND APPARATUS FOR EVENT HANDLING IN A SERVICE-BASED COMMUNICATION ARCHITECTURE IN A WIRELESS COMMUNICATION SYSTEM

(71) Applicant: Samsung Electronics Co., Ltd., Suwon-si (KR)

(72) Inventors: Ramkumar Rukmangathan, Bangalore (IN); Meghna Khaturia, Bangalore (IN); Neha Sharma, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 18/662,363

(22) Filed: May 13, 2024

(65) Prior Publication Data

US 2024/0397305 A1 Nov. 28, 2024

(30) Foreign Application Priority Data

May 25, 2023 (IN) ............................ 202341036172
Jan. 11, 2024 (IN) ............................ 202341036172

(51) Int. Cl.
*H04W 4/50* (2018.01)
*H04W 8/20* (2009.01)

(52) U.S. Cl.
CPC ............... *H04W 8/20* (2013.01); *H04W 4/50* (2018.02)

(58) Field of Classification Search
CPC .......... H04W 8/20; H04W 4/50; H04L 67/51; H04L 67/55
See application file for complete search history.

(56) References Cited

U.S. PATENT DOCUMENTS

2005/0015472 A1 1/2005 Catania et al.
2005/0135260 A1 6/2005 Todd
(Continued)

FOREIGN PATENT DOCUMENTS

WO 2021/063657 A1 4/2021
WO 2022/172196 A1 8/2022

OTHER PUBLICATIONS

International Search Report dated Aug. 19, 2024, issued in International Application No. PCT/KR2024/006482.
(Continued)

*Primary Examiner* — Chuong A Ngo
(74) *Attorney, Agent, or Firm* — Jefferson IP Law, LLP

(57) ABSTRACT

A method implemented in a network entity for event handling in a service-based communication architecture is provided. The method includes receiving at least one request from one or more subscriber network functions for subscribing to one or more services available at the network entity, wherein the one or more services are created by one or more publisher network functions a subscription of the one or more services based on the received request, receiving one or more event messages from the one or more publisher network functions, wherein the one or more event messages represent an occurrence of an event associated with the one or more services, transmitting one or more event notifications to the one or more subscriber network functions, wherein the one or more event notifications notify the one or more subscriber network functions about the occurrence of the event associated with the one or more services.

15 Claims, 21 Drawing Sheets

(56) References Cited

U.S. PATENT DOCUMENTS

| | | | | |
|---|---|---|---|---|
| 2017/0317935 | A1* | 11/2017 | Murthy | G06Q 10/101 |
| 2018/0309831 | A1* | 10/2018 | Sherman | H04L 12/66 |
| 2021/0240554 | A1 | 8/2021 | Landais et al. | |
| 2022/0338104 | A1 | 10/2022 | Son et al. | |

OTHER PUBLICATIONS

ZTE, Request-Response service interaction alternative, 3GPP TSG-SA WG2 Meeting #132, S2-1903795, Apr. 2, 2019, Xi'an, China.

3GPP TS 23.501 V18.2.2; 3rd Generation Partnership Project; Technical Specification Group Services and System Aspects; System architecture for the 5G System (5GS); Stage 2 (Release 18), Jul. 7, 2023.

A. B. Roach Dynamicsoft, Session Initiation Protocol (SIP)—Specific Event Notification, RFC 3265, Internet Engineering Task Force (IETF), Standard, Internet Society (ISOC), Jun. 1, 2002, XP015009043, Geneva, Switzerland.

Extended European Search Report dated Mar. 10, 2026, issued in European Patent Application No. 24811325.0.

* cited by examiner

METHODS AND APPARATUS FOR EVENT HANDLING IN A SERVICE-BASED COMMUNICATION ARCHITECTURE IN A WIRELESS COMMUNICATION SYSTEM

CROSS-REFERENCE TO RELATED APPLICATION(S)

This application is based on and claims priority under 35 U.S.C. § 119(a) of an Indian Provisional patent application number 202341036172, filed on May 25, 2023, in the Indian Patent Office, and of an Indian Complete patent application number 202341036172, filed on Jan. 11, 2024, in the Indian Patent Office, the disclosure of each of which is incorporated by reference herein in its entirety.

BACKGROUND

1. Field

The disclosure relates to wireless networks. More particularly, the disclosure relates to a system and a method for event handling in a service-based communication architecture.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)—level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

Aspects of the disclosure are to address at least the above-mentioned problems and/or disadvantages and to provide at least the advantages described below. Accordingly, an aspect of the disclosure is to provide a system and a method for event handling in a service-based communication architecture.

Additional aspects will be set forth in part in the description which follows and, in part, will be apparent from the description, or may be learned by practice of the presented embodiments.

In accordance with an aspect of the disclosure, a method implemented in a network entity for event handling in a service-based communication architecture is provided. The method includes receiving at least one request from one or more subscriber network functions for subscribing to one or more services available at the network entity, wherein the one or more services are created by one or more publisher network functions, creating, for the one or more subscriber network functions, a subscription of the one or more services based on the received request, receiving, upon creating the subscription to the one or more services, one or more event messages from the one or more publisher network functions, wherein the one or more event messages represent an occurrence of an event associated with the one or more services, and transmitting, upon receiving the one or more event messages, one or more event notifications to the one or more subscriber network functions, wherein the one or more event notifications notify the one or more subscriber network functions about the occurrence of the event associated with the one or more services.

In accordance with another aspect of the disclosure, a system for event handling in a service-based communication architecture is provided. The system includes memory storing one or more computer programs and one or more processors communicatively coupled to the memory, wherein the one or more computer programs include computer-executable instructions that, when executed by the one or more processors, cause the system to receive at least one request from one or more subscriber network functions for subscribing to one or more services available at a network entity, wherein the one or more services are created by one or more publisher network functions, create, for the one or more subscriber network functions, a subscription of the one or more services based on the received request, receive, upon creating the subscription to the one or more services, one or more event messages from the one or more publisher network functions, wherein the one or more event messages represent an occurrence of an event associated with the one or more services, and transmit, upon receiving the one or more event messages, one or more event notifications to the one or more subscriber network functions, wherein the one or more event notifications notify the one or more subscriber network functions about the occurrence of the event associated with the one or more services.

In accordance with another aspect of the disclosure, one or more non-transitory computer-readable storage media storing computer-executable instructions that, when executed by one or more processors of a system, cause the system to perform operations are provided. The operations include receiving at least one request from one or more subscriber network functions for subscribing to one or more services available at the network entity, wherein the one or more services are created by one or more publisher network functions, creating, for the one or more subscriber network functions, a subscription of the one or more services based on the received request, receiving, upon creating the subscription to the one or more services, one or more event messages from the one or more publisher network functions, wherein the one or more event messages represent an occurrence of an event associated with the one or more services, and transmitting, upon receiving the one or more event messages, one or more event notifications to the one or more subscriber network functions, wherein the one or more event notifications notify the one or more subscriber network functions about the occurrence of the event associated with the one or more services.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The fifth generation (5G) core network is a fundamental part of 5G wireless communication systems. The 5G core (5GC) plays a crucial role in providing advanced capabilities and services. The 5G core network is designed based on a service-based network architecture including network functions (NFs) and uses synchronous service-based interfaces for inter-NF communications. This means the communication between NFs is facilitated via a request-response mechanism. However, there are cases when an NF is required to inform other NFs about an event. These cases require asynchronous communication. The NFs are the building blocks of the service-based architecture that provide specific functionalities to enable the proper operation and management of the network. To enable asynchronous communication between NFs, the subscribe-notify mechanism was enabled using an event exposure service.

Figure 1:
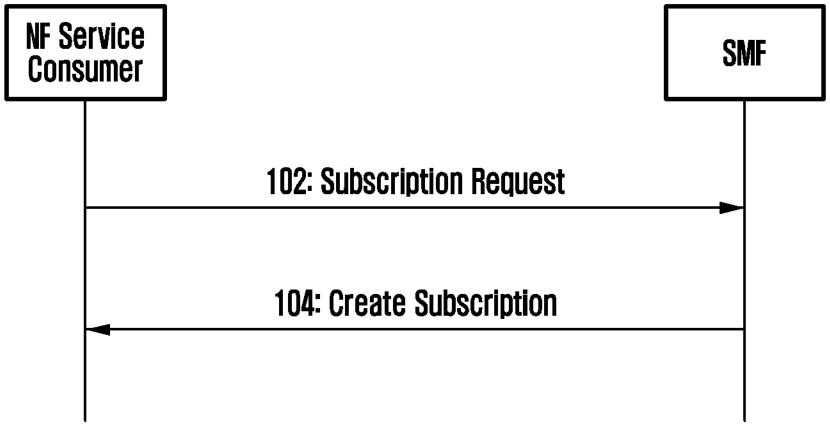
FIG. 1 illustrates a flow diagram of a solution for creation of a service according to the related art.

FIG. 1 illustrates a flow diagram of a solution for creation of a service according to the related art.

Referring to FIG. 1, the call flow shows how to subscribe to the events in the network.

At operation 102, the NF service consumer shares a subscription request with the session management function (SMF).

Further, at operation 104, the SMF creates the subscription based on the received subscription request.

Figure 2:
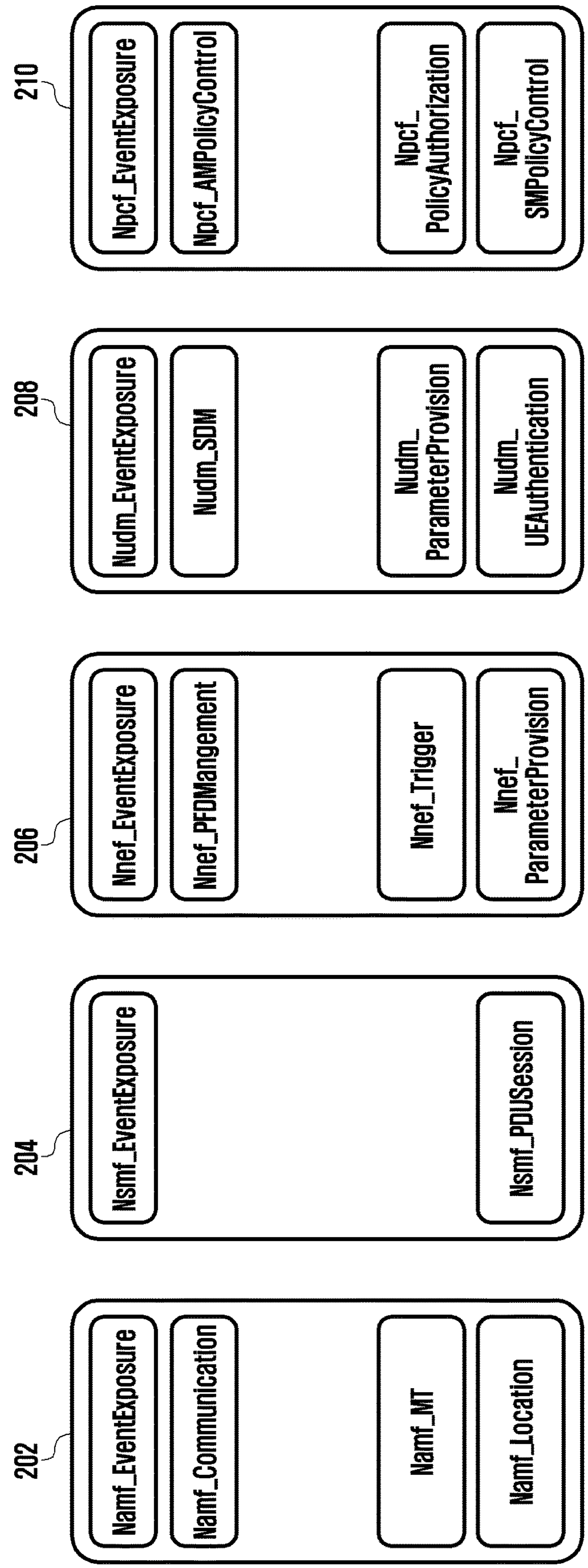
FIG. 2 illustrates a block diagram showing multiple network functions (NFs) according to the related art.

FIG. 2 illustrates a block diagram showing multiple network functions (NFs) according to the related art.

Referring to FIG. 2, for example, the multiple NFs may be access and mobility management function (AMF) 202, session management function (SMF) 204, network exposure function (NEF) 206, user-defined function (UDF) 208, and policy control function (PCF) 210. In an embodiment of the disclosure, the multiple NFs include the same service which performs a set of functionalities, such as event generation, subscription, un-subscription, notify, and the like.

For a microservice/NF to be designed optimally, multiple principles are required to be followed while designing the NF. For example, the multiple principles correspond to a single responsibility principle, high cohesion and low coupling, reusability, and the like. In the single reasonability principle, the NF is required to be designed with a single concern. Further, in the high cohesion and low coupling, the interdependence between NFs to complete a task is required to be less. In reusability, the NFs are required to be designed for optimal reuse, and code redundancy is required to be minimized. Current NF's design in 5GC fails to follow these multiple principles. For example, the current NF's design violates the single responsibility principle as the current NF's design manages event subscription and notify services other than core services provided by the NF. In addition, in the current NF design, if a single service is defined in multiple NFs, it leads to code redundancy and violates the reusability principle.

Further, the event exposure service as part of the NF leads to certain performance issues. For example, producer NFs deliver events to all the consumer NFs that have subscribed to it (third generation partnership project (3GPP) has defined 30+ NFs in the core in TS 23.502). Further, the number of NFs may also increase drastically in 6G for the service-based architecture that promotes easier addition of new services in the network. With the large number of NFs requesting event subscriptions, it may be challenging and resource-heavy for the producer NF to respond to the request for the event subscription. Further, frequent event generation and handling message delivery to multiple NFs may also impact other core functionality, such as mobility management in AMF, and the like. In addition, frequent event generation and handling message delivery to multiple NFs may also cause high procedure completion time, increase in latency, inefficient NF resource usage, and the like.

Furthermore, the event exposure service as part of the NF leads to poor recovery from node failure. The consumer NFs create multiple subscriptions with producer NFs for receiving events. In a signal storm or node failure, the NF is required to release resources allocated to subscribed resources or consumer resources, such as callback uniform resource allocator (URL), and the like. As a result, the signal storm or the node failure leads to the loss of all the subscription states, and NFs are required to subscribe to events again.

Accordingly, there is a need for a technique to overcome the above-identified problems.

The above information is presented as background information only to assist with an understanding of the disclosure. No determination has been made, and no assertion is made, as to whether any of the above might be applicable as prior art with regard to the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 3:
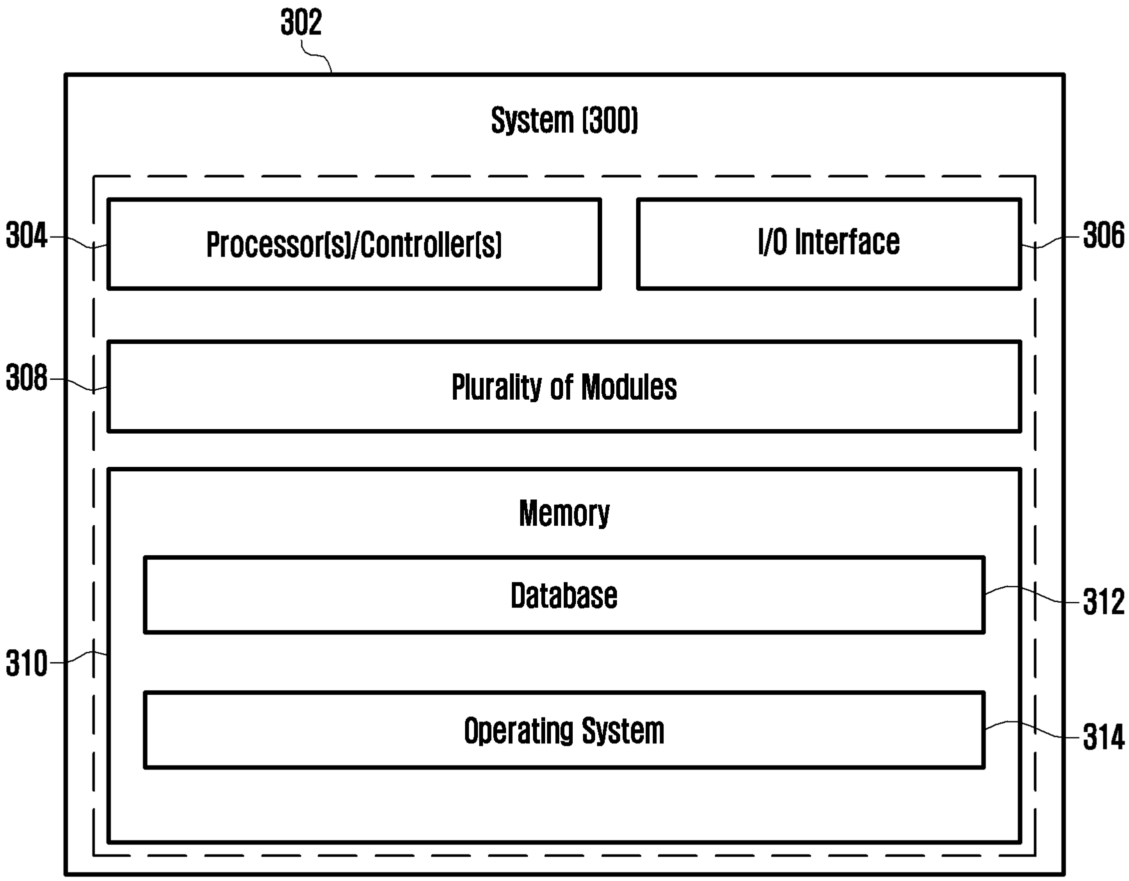
FIG. 3 illustrates a block diagram of a system for event handling in a service-based communication architecture according to an embodiment of the disclosure.

FIG. 3 illustrates a block diagram of a system for event handling in a service-based communication architecture according to an embodiment of the disclosure.

Referring to FIG. 3, in an embodiment of the disclosure, a system 300 corresponds to a network entity for event handling in the service-based communication architecture. For example, the network entity is a network function, an entity located in a service communication proxy (SCP) network function or located in a network function of a service-based communication network. The architecture of the network function for event handling in the service-based communication architecture have been elaborated in subsequent paragraphs at least with reference to FIG. 9. In an embodiment of the disclosure, the event handling corresponds to the process of managing and responding to various events, incidents, or occurrences that may impact the operation, performance, and security of the network. Further, the system 300 is implemented in a core network 302, such as fifth generation (5G) core network.

The system 300 may include one or more processors/controllers 304, an input/output (I/O) interface 306, a plurality of modules 308, and memory 310.

In an embodiment of the disclosure, the one or more processors/controllers 304 may be operatively coupled to each of the respective I/O interface 306, the plurality of modules 308, and the memory 310. In one embodiment of the disclosure, the one or more processors/controllers 304 may include at least one data processor for executing processes in a virtual storage area network. The one or more processors/controllers 304 may include specialized processing units, such as integrated system (bus) controllers, memory management control units, floating point units, graphics processing units, digital signal processing units, or the like. In one embodiment of the disclosure, the one or more processors/controllers 304 may include a central processing unit (CPU), a graphics processing unit (GPU), or both. The one or more processors/controllers 304 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 304 may execute a software program, such as code generated manually (i.e., programmed) to perform the desired operation. In an embodiment of the disclosure, the processors/controllers may be a general-purpose processor, such as the CPU, an application processor (AP), or the like, a graphics-only processing unit, such as the GPU, a visual processing unit (VPU), and/or an artificial intelligence (AI)-dedicated processor, such as a neural processing unit (NPU).

Further, the one or more processors/controllers 304 control the processing of input data in accordance with a predefined operating rule or machine learning (ML) model stored in non-volatile memory and volatile memory. The predefined operating rule or the ML model is provided through training or learning.

Here, being provided through learning means that, by applying a learning technique to a plurality of learning data, a predefined operating rule or the ML model of a desired characteristic is made. The learning may be performed in a device itself in which ML according to an embodiment is performed, and/or may be implemented through a separate server/system.

Furthermore, the ML model may consist of a plurality of neural network layers. Each layer has a plurality of weight values and performs a layer operation through the calculation of a previous layer and an operation of a plurality of weights. Examples of neural networks include, but are not limited to, convolutional neural networks (CNNs), deep neural networks (DNNs), recurrent neural networks (RNNs), restricted Boltzmann machines (RBMs), deep belief networks (DBNs), bidirectional recurrent deep neural networks (BRDNNs), generative adversarial networks (GANs), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

The one or more processors/controllers 304 may be disposed in communication with one or more input/output (I/O) devices via the respective I/O interface. The I/O interface 306 may employ communication code-division multiple access (CDMA), high-speed packet access (HSPA+), global system for mobile communications (GSM), long-term evolution (LTE), worldwide interoperability for microwave access (WiMax), or the like, or the like.

The one or more processors/controllers 304 may be disposed in communication with a communication network via a network interface. In an embodiment of the disclosure, the network interface may be the I/O interface 306. The network interface may connect to the communication network to enable the connection of the core network 302 with electronic devices, such as smartphones. The network interface may employ connection protocols including, without limitation, direct connect, Ethernet (e.g., twisted pair 10/300/3000 Base T), transmission control protocol/internet protocol (TCP/IP), token ring, institute of electrical and electronics engineers (IEEE) 802.11a/b/g/n/x, or the like. The communication network may include, without limitation, a direct interconnection, local area network (LAN), wide area network (WAN), wireless network (e.g., using wireless application protocol), the Internet, and the like.

In some embodiments of the disclosure, the memory 310 may be communicatively coupled to the one or more processors/controllers 304. The memory 310 may be configured to store data, and instructions executable by the one or more processors/controllers 304. The memory 310 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 310 may include cache or random-access memory for the one or more processors/controllers 304. In alternative examples, the memory 310 is a part of the one or more processors/controllers 304, such as cache memory of a processor, the system memory, or other memory. In some embodiments of the disclosure, the memory 310 may be an external storage device or database for storing data. The memory 310 may be operable to store instructions executable by the one or more processors/controllers 304. The functions, acts, or tasks illustrated in the figures or described may be performed by the programmed processor/controller for executing the instructions stored in the memory 310. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In some embodiments of the disclosure, the plurality of modules 308 may be included within the memory 310. The memory 310 may further include a database 312 to store data. The plurality of module 308 may include a set of instructions that may be executed to cause the system 300 to perform any one or more of the methods/processes disclosed herein. The plurality of modules 308 may be configured to perform the operations of the disclosure using the data stored in the database 312 for event handling in the service-based communication architecture, as discussed herein. In an embodiment of the disclosure, each of the plurality of modules 308 may be a hardware unit that may be outside the memory 310. Further, the memory 310 may include an operating system 314 for performing one or more tasks of the system 300, as performed by a generic operating system in the communications domain. In one embodiment of the disclosure, the database 312 may be configured to store the information as required by the plurality of modules 308 and the one or more processors/controllers 304 for event handling in the service-based communication architecture.

In an embodiment of the disclosure, at least one of the plurality of modules 308 may be implemented through the ML model. A function associated with the ML may be performed through the non-volatile memory, the volatile memory, and the one or more processors/controllers 304.

In an embodiment of the disclosure, the I/O interface 306 may enable input and output to and from the system 300 using suitable devices, such as, but not limited to, a display, a keyboard, a mouse, a touch screen, a microphone, a speaker, and so forth.

Further, the disclosure also contemplates a computer-readable medium that includes instructions or receives and executes instructions responsive to a propagated signal. Further, the instructions may be transmitted or received over the network via a communication port or interface or using a bus (not shown). The communication port or interface may be a part of the one or more processors/controllers 304 or may be a separate component. The communication port may be created in software or may be a physical connection in hardware. The communication port may be configured to connect with an electronic device, external media, the display, or any other components in the core network 302, or combinations thereof. The connection with the electronic device may be a physical connection, such as a wired Ethernet connection, or may be established wirelessly. Likewise, the additional connections with other components of the core network 302 may be physical or may be established wirelessly. The network may alternatively be directly connected to the bus. For the sake of brevity, the architecture, and standard operations of the operating system 314, the memory 310, the database 312, the one or more processors/controllers 304, and the I/O interface 306 are not discussed further.

Figure 4:
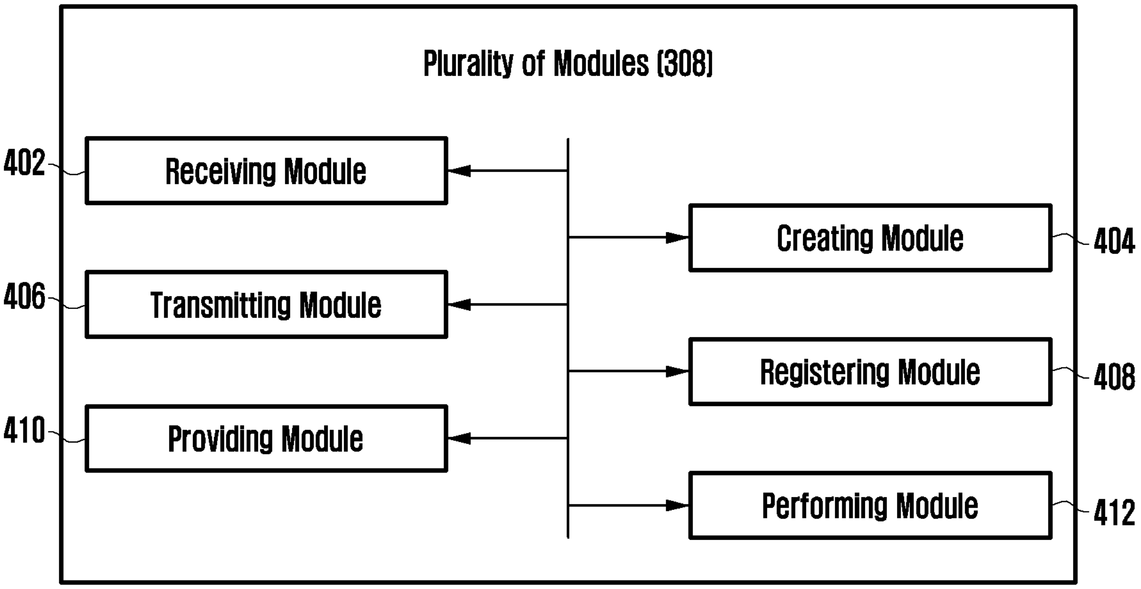
FIG. 4 illustrates a block diagram of a plurality of modules of a system at a core network for event handling in a service-based communication architecture according to an embodiment of the disclosure.

FIG. 4 illustrates a block diagram of a plurality of modules of a system at a core network for event handling in a service-based communication architecture according to an embodiment of the disclosure.

Referring to FIG. 4, in an embodiment of the disclosure, the plurality of modules 308 may include, but is not limited to, a receiving module 402, a creating module 404, a transmitting module 406, a registering module 408, a providing module 410, and a performing module 412. The plurality of modules 308 may be implemented by way of suitable hardware and/or software applications.

In an embodiment of the disclosure, the receiving module 402 may be configured to receive at least one request from one or more subscriber network functions for subscribing to one or more services available at the network entity. In an embodiment of the disclosure, the one or more subscriber network functions are a category of network functions in wireless networks that are related to subscriber management, authentication, and authorization. For example, the one or more services are load balancing services, firewall services, routing services, and the like. In an embodiment of the disclosure, the one or more services are created by one or more publisher network functions.

Further, the creating module 404 may be configured to create, for the one or more subscriber network functions, a subscription of the one or more services based on the received request.

Furthermore, the receiving module 402 may be configured to receive, upon creating the subscription to the one or more services, one or more event messages from the one or more publisher network functions. In an embodiment of the disclosure, the one or more event messages represent an occurrence of an event associated with the one or more services.

Further, the transmitting module 406 may be configured to transmit, upon receiving the one or more event messages, one or more event notifications to the one or more subscriber network functions. In an embodiment of the disclosure, the one or more event notifications notify the one or more subscriber network functions about the occurrence of the event associated with the one or more services.

Furthermore, prior to receiving the at least one request from one or more subscriber network functions for subscribing to the one or more services, the receiving module 402 may be configured to receive a registration request from each of the one or more subscriber network functions, and the one or more publisher network functions. In an embodiment of the disclosure, the registration request is received to register the one or more subscriber network functions and the one or more publisher network functions. Accordingly, the registering module 408 may be configured to register each of the one or more subscriber network functions and the one or more publisher network functions based on the received registration request. The details on the registration of the one or more subscriber network functions and the one or more publisher network functions have been elaborated in subsequent paragraphs at least with reference to FIGS. 6A to 6C.

Further, the providing module 410 may be configured to store, in a repository, a set of events generated by each of the one or more subscriber network functions and the one or more publisher network functions. In an embodiment of the disclosure, the set of events correspond to events related to subscription of the one or more services, un-subscription of the one or more services, notifications transmitted to the one or more subscriber network functions, pausing the subscription of the one or more services, and resuming the subscription of the one or more services. Further, the providing module 410 may be configured to provide access of the stored set of events to one or more network analytics functions. Details on the storage of the set of events in the repository have been elaborated in subsequent paragraphs at least with reference to FIG. 12.

The transmitting module 406 may be configured to receive a set of control plane messages from the one or more publisher network functions. In an embodiment of the disclosure, the set of control plane messages are a type of communication used within the network functions for controlling and managing the operation of the network. Further, the transmitting module 406 may be configured to generate a set of producer events based on the received set of control plane messages. In an embodiment of the disclosure, the set of producer events are the events which are generated by the one or more producer network functions. Furthermore, the transmitting module 406 may be configured to transmit the generated set of producer events to the one or more subscriber network functions that have subscribed to the set of producer events.

In an embodiment of the disclosure, the performing module 412 may be configured to receive one or more topic messages from the one or more publisher network functions. In an embodiment of the disclosure, the one or more topic messages are messages related to mobility, security, session, or any combination thereof. Further, the performing module 412 may be configured to receive one or more topic messages from the one or more publisher network functions. In an embodiment of the disclosure, the one or more topic operations include creating, deleting, modifying a topic, or any combination thereof.

Further, the performing module 412 may be configured to receive a request from the one or more subscriber network functions for obtaining a subscription list. In an embodiment of the disclosure, the subscription list corresponds to a list of subscriber functions who have authorized access to the network's events and resources. Further, the performing module 412 may be configured to transmit a set of session-related events and a set of mobility-related events to the one or more subscriber network functions based on the received request. Furthermore, the performing module 412 may be configured to receive a session request from the one or more subscriber network functions to perform a session operation. In an embodiment of the disclosure, the session operation is pausing session-related events, resuming the session-related events, or unsubscribing mobility-related events. The performing module 412 may also be configured to perform the session operation based on a type of the session request. For example, when the session request is for resuming the session-related events, the network entity resumes the session-related events for the one or more subscriber network functions. Details on the session operation have been elaborated in subsequent paragraphs at least with reference to FIG. 11.

Furthermore, the receiving module 402 may be configured to receive a metadata request from the one or more publisher network functions. In an embodiment of the disclosure, the metadata request is based on network function settings and a network entity configuration. The network function settings refer to the configuration parameters and options that determine the behavior and operation of network functions within a network. Further, the receiving module 402 may be configured to determine one or more required events to be generated by the one or more publisher network functions based on the received request. The receiving module 402 may be configured to transmit, upon determining the one or more required events, a network entity set, and an instance identity (ID) associated with the network entity to the one or more publisher network functions. Furthermore, the receiving module 402 may be configured to receive, via the network entity set and the instance ID, the one or more required events from the one or more publisher network functions. In an embodiment of the disclosure, the one or more required events include session related events, mobility related events, network function related events, or any combination thereof. Details on receiving the one or more required events from the one or more publisher network functions have been elaborated in subsequent paragraphs at least with reference to FIG. 13.

Further, the receiving module 402 may be configured to receive producer information from the one or more publisher network functions in a registration message. In an embodiment of the disclosure, the producer information includes an instance identifier (ID), a slice type, release version information associated with the one or more publisher network functions. The instance ID corresponds to a unique identifier associated with a specific instance or instantiation of a network function. Furthermore, the receiving module 402 may be configured to determine an optimal network entity set from a plurality of network entity sets and an optimal instance ID from a plurality of IDs based on one or more network parameters. In an embodiment of the disclosure, the network parameters include operator information, slice information, a local event load at each of the plurality of network entity sets, an availability status of each of the plurality of network entity sets, and the like. The receiving module 402 may be configured to transmit the determined optimal network entity and the determined optimal instance ID along with a fully qualified domain name (FQDN) or an Internet protocol (IP) address to the one or more publisher network functions. Furthermore, the receiving module 402 may be configured to receive, from the one or more publisher network functions, one or more events by using the determined optimal network entity, the determined optimal instance ID, and the FQDN or the IP address. Details on the instance ID and the network entity set have been elaborated in subsequent paragraphs at least with reference to FIGS. 10A and 10B.

Further, the receiving module 402 may be configured to determine that the determined optimal network entity and the determined optimal instance ID are unfunctional due to one or more errors. The receiving module 402 may be configured to determine other optimal network entity set from the plurality of network entity sets and other optimal instance ID from the plurality of IDs based on the one or more network parameters. The receiving module 402 may be configured to transmit the determined other optimal network entity and the determined other optimal instance ID along with the FQDN or the IP address to the one or more publisher network functions. Furthermore, the receiving module 402 may be configured to receive, from the one or more publisher network functions, the one or more events by using the determined other optimal network entity, the determined other optimal instance ID, and the FQDN or the IP address.

The details on operation of the system 300 for event handling in the service-based communication architecture have been elaborated in subsequent paragraphs at least with reference to FIGS. 5A to 5C, and 8.

Figure 5A:
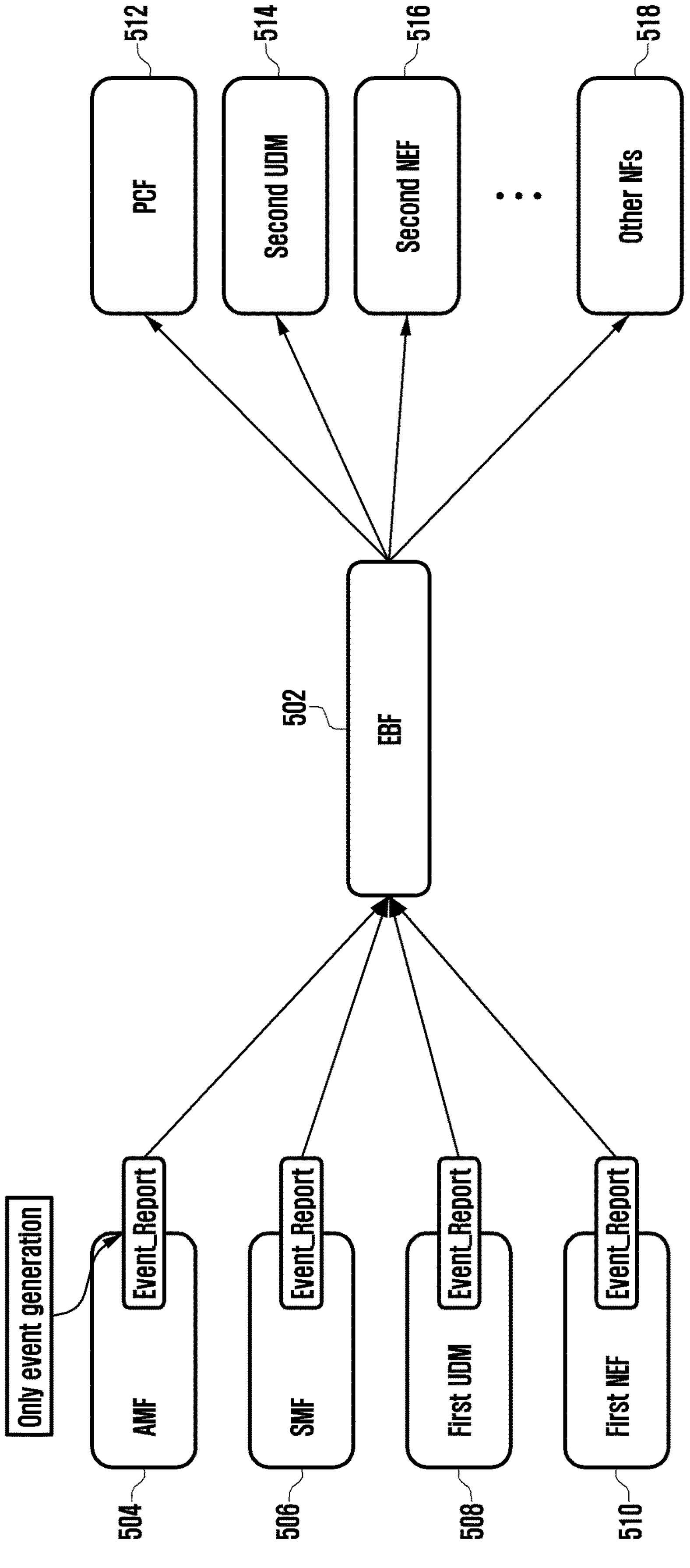
FIG. 5A illustrates a block diagrams depicting an operation of a system for event handling in a service-based communication architecture according to various embodiments of the disclosure.
Figure 5B:
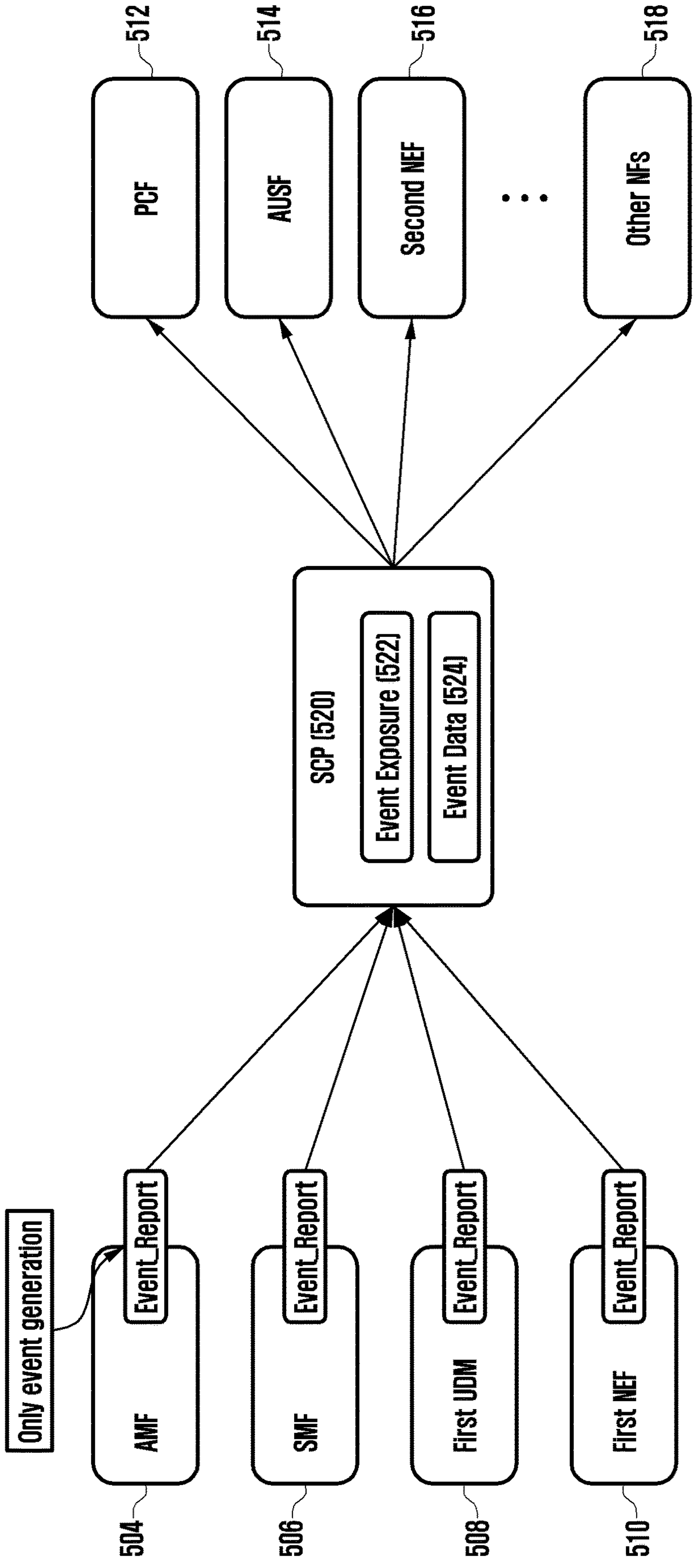
FIG. 5B illustrates a block diagrams depicting an operation of a system for event handling in a service-based communication architecture according to various embodiments of the disclosure.
Figure 5C:
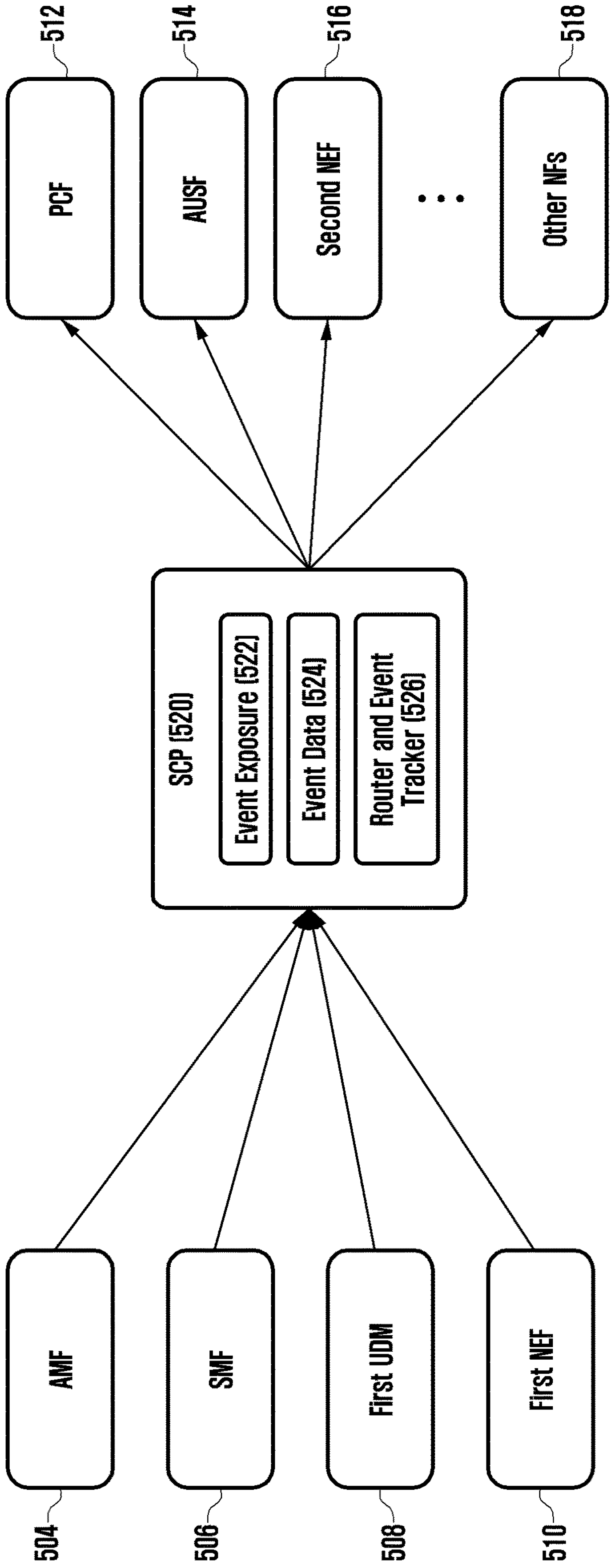
FIG. 5C illustrates a block diagrams depicting an operation of a system for event handling in a service-based communication architecture according to various embodiments of the disclosure.

FIGS. 5A to 5C illustrate block diagrams depicting an operation of a system for event handling in a service-based communication architecture according to various embodiments of the disclosure. Details on the system 300 for event handling in the service-based communication architecture have been explained with reference to FIGS. 3 and 4.

Referring to FIG. 5A, the EBF 502 i.e., event broker function (EBF) handles the event functionality i.e., events for multiple network functions. The EBF 502 performs a set of functions for the multiple network functions. In an embodiment of the disclosure, the multiple network functions may include access and mobility management function (AMF) 504, session management function (SMF) 506, a first user-defined function (UDF) 508, a first network exposure function (NEF) 510, policy control function (PCF) 512, a second UDM 514, a second NEF 516, and other network functions 518. In an embodiment of the disclosure, the network functions (i.e., the AMF 504, the SMF 506, the UDF 508, and the NEF 510) perform only event generation.

In an embodiment of the disclosure, the system 300 updates the event exposure service. As a result, the multiple network functions only notify an event to a single entity, i.e., the network entity. Further, the multiple network functions do not handle subscription/un-subscription/notifications of events. In addition, the multiple network functions are not required to consider about who or how many event consumers are present and how to route the events to these event consumers. In an embodiment of the disclosure, event exposure functionality of the multiple network functions in the core network 302 are aggregated at the EBF 502. The EBF 502 handles all the functionalities of the event exposure service in a centralized manner. In an embodiment of the disclosure, the EBF 502 enables single responsibility principle. Further, the EBF 502 only manages the core functionality and reduces the impact on the core functionality. Furthermore, critical resources, such as storage and compute resources in critical network functions are freed, thereby reducing processing time. As the number of network functions in the core network 302 may grow, the EBF 502 may block critical network functions in management related activities, such as relaying events to the multiple network functions.

Referring to FIG. 5B, SCP 520 handles the event functionality i.e., events for multiple network functions. The SCP 520 performs the set of functions for the multiple network functions. In an embodiment of the disclosure, the multiple network functions may include the AMF 504, the SMF 506, the UDF 508, the NEF 510, the PCF 512, an authentication server function (AUSF) 513, the second NEF 516, and other network functions 518. In 5G core network function deployment model D, by default all messages between the core network function are routed via the SCP 520. In case of Model D, the event broker function is not required to be introduced as a separate network function, rather the event broker function can be introduced as a service in the existing SCP. The system 300 enables the multiple network functions to act as an event generator for generating events. In an embodiment of the disclosure, the events generated by the multiple network functions are directly sent to the SCP 520. Further, event exposure 522 in SCP 520 keeps track of all subscription and un-subscription of events. The event exposure 522 also pause or resume the subscription of events and manages message delivery.

Furthermore, event data 524 in SCP 520 maintains data of events which can be later used for performing one or more analytics operations using the AI/ML model. The SCP 520 can serve as single point where all generated events are stored, such that the one or more analytics operations are performed. The SCP 520 provides a single application programming interface (API) to fetch multiple event information and hence reduces latency and accelerates model training.

Referring to FIG. 5C, SCP 520 handles the event functionality i.e., events for multiple network functions. In this design of SCP 520, a router and event tracker 526 is introduced in the SCP 520. Since all the control plane messages are flowing through SCP 520, the router and event tracker 526 can automatically generate an event and send to subscribed network function. In this design of the SCP 520, a network function does not generate events. The route and event tracker 526 analyses the messages and generates events based on the analysis. The network function resources are freed as the multiple network functions are not required to track the event. For example, whenever the SCP 520 detects control plane messages related to user equipment (UE) Internet protocol (IP) change, the SCP 520 automatically sends this information as an event to any consumer network function that may have subscribed for it.

Figure 6A:
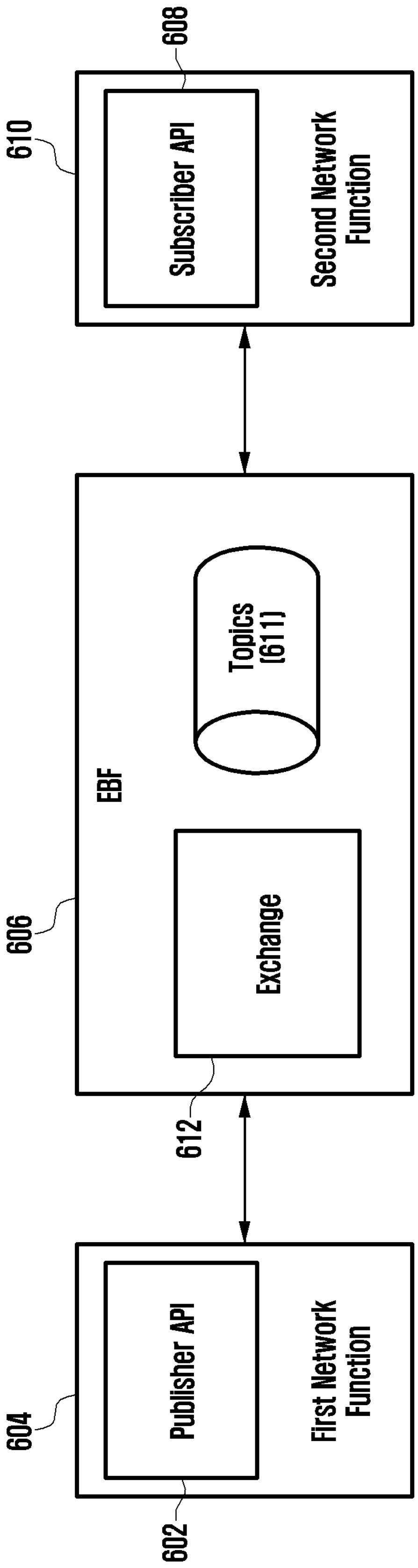
FIG. 6A illustrates a block diagram depicting an architecture of an event broker function (EBF) according to an embodiment of the disclosure.
Figure 6B:
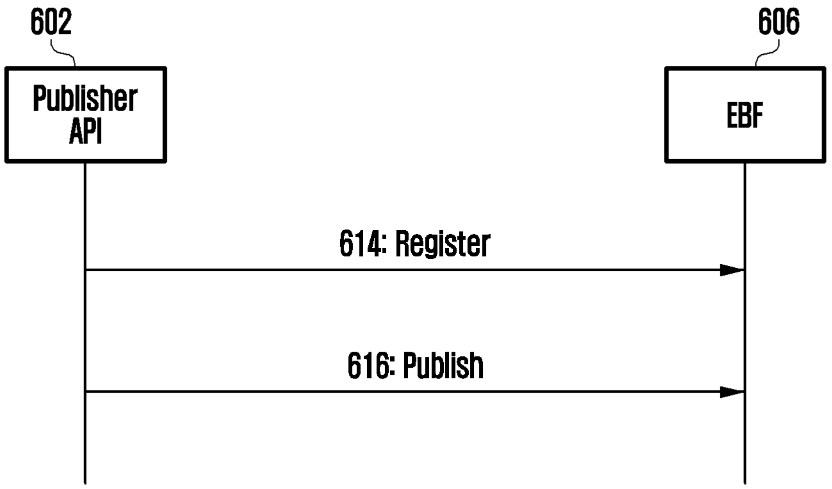
FIG. 6B illustrates a flow diagrams showing messages supported by a publisher application programming interface (API) associated with a network function according to various embodiments of the disclosure.
Figure 6C:
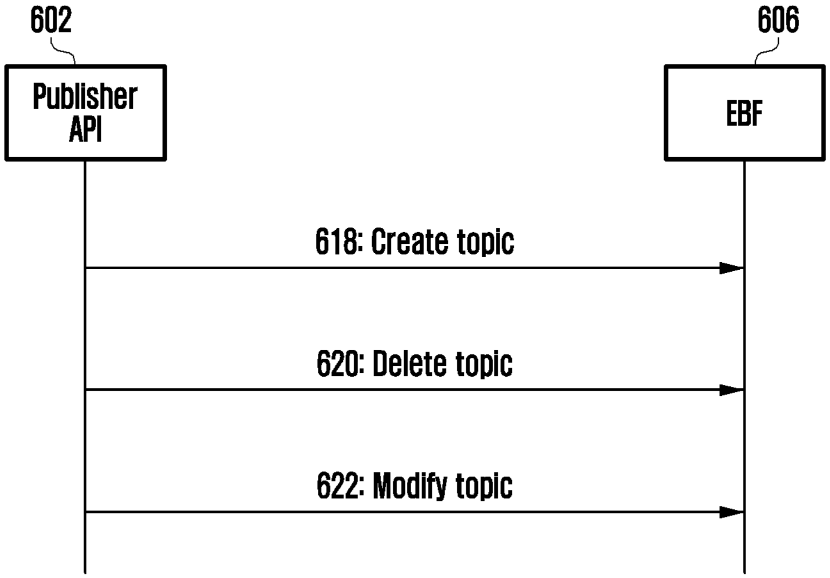
FIG. 6C illustrates a flow diagrams showing messages supported by a publisher application programming interface (API) associated with a network function according to various embodiments of the disclosure.

FIG. 6A illustrates a block diagram depicting an architecture of an EBF according to an embodiment of the disclosure. Further, FIGS. 6B and 6C illustrate flow diagrams showing messages supported by a publisher application programming interface (API) associated with the network function, according to various embodiments of the disclosure. For the sake of brevity, FIGS. 6A to 6C are explained together. Details on the network function and registration of the one or more subscriber network functions and the one or more publisher network functions have been explained with reference to FIG. 4.

Referring to FIG. 6A, a publisher API 602 is installed in a first network function 604. In an embodiment of the disclosure, the publisher API 602 includes multiple functions that can be used to register with an EBF 606, publish events, or create topics in the EBF 606. Further, a subscriber API 608 is installed in a second network function 610 which wants to subscribe to the events. In an embodiment of the disclosure, the subscriber API 608 includes multiple functions that can be used to register with the EBF 606 and start and stop a subscription. The EBF 606 includes topics 611 and exchange 612. The topics 611 are logical channels in the EBF 606 which enable the subscriber API 608 to identify the types of messages that the subscriber API 608 is interested in. Further, the exchange 612 helps to route the messages inside the EBF 606 based on which topic it belongs to. The protocol used for communication between APIs may be an open-source application layer protocol, such as application message queuing protocol (AMQP). In an embodiment of the disclosure, the architecture disclosed in FIG. 6A may also be used in the SCP.

Referring to FIG. 6B, the publisher API 602 in the first network function 604 may send a register message to the EBF 606 for registering with the second network function 610, at operation 614. In an embodiment of the disclosure, the register message is as below:

```
Register
{
  host ID -
  IP Address -
  Protocol Type -
}
```

Further, at operation 616, the publisher API 602 in the first network function 604 may send the event message to the EBF 606 through a publish command. The publish command may be:

```
Publish
{
  Payload -
  Topic Name -
  Host ID -
}
```

Referring to FIG. 6C, the publisher API 602 may send a create topic message to the EBF 606 for creating a new topic, at operation 618. In an embodiment of the disclosure, the create topic message is as below:

```
Create Topic:
{
  host ID -
  IP Address -
  Topic ID -
  Expiration -
}
```

Further, at operation 620, the publisher API 602 may send a delete topic message to the EBF 606 for deleting an existing topic. At operation 622, the publisher API 602 may send a modified topic message to the EBF 606 for modifying the existing topic. In an embodiment of the disclosure, the publisher API 602 may create multiple topics based on different domains in the network.

Figure 7A:
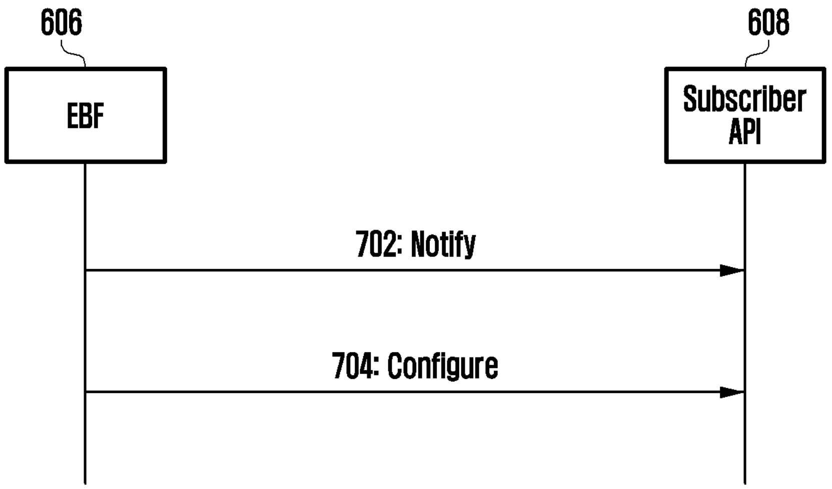
FIG. 7A illustrates a flow diagram showing messages supported by an EBF according to an embodiment of the disclosure.
Figure 7B:
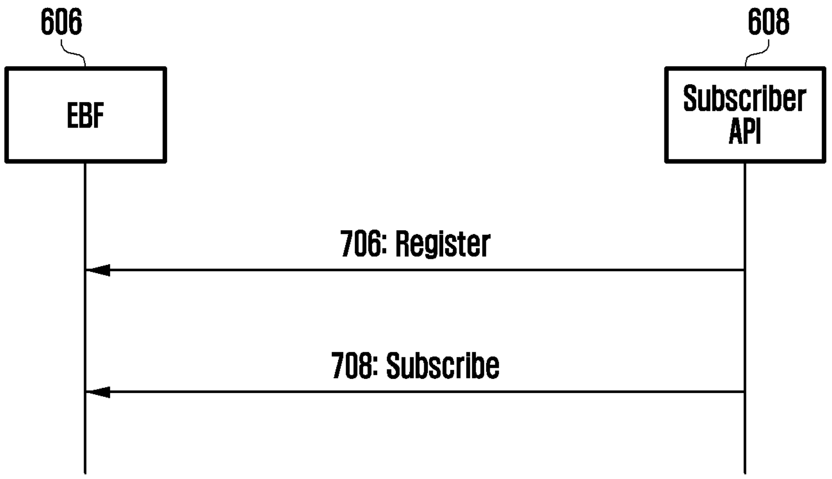
FIG. 7B illustrates a flow diagram showing messages supported by a subscriber API associated with a network function according to an embodiment of the disclosure.

FIG. 7A illustrates a flow diagram showing messages supported by an EBF according to an embodiment of the disclosure. Further, FIG. 7B illustrates a flow diagram showing messages supported by a subscriber API associated with a network function according to an embodiment of the disclosure. For the sake of brevity, FIGS. 7A and 7B are explained together. Details on creating the subscription of the one or more services for the one or more subscriber network functions have been explained with reference to FIG. 4.

Referring to FIG. 7A, the notify message is received by the subscriber API 608 in the second network function 610, at operation 702. Further, at operation 704, the EBF 606 may configure the publisher API 602 and the subscriber API 608. The EBF 606 may set the timeouts, keepalive, acknowledgment features, and the like. The EBF 606 may also set the listener in the subscriber API 608.

Referring to FIG. 7B, the subscriber API 608 in the second network function 610 may send the register message to the EBF 606 to register with the first network function 604, at operation 706. In an embodiment of the disclosure, the register message is as below:

```
Register
{
  host ID -
  IP Address -
  Protocol Type -
}
```

Further, at operation 708, the subscriber API 608 may subscribe to an event using a subscribe message. In an embodiment of the disclosure, the subscriber message is as below:

```
Subscribe
{
  host ID -
  Event Type -
  Topic -
  Timer
}
```

Figure 8:
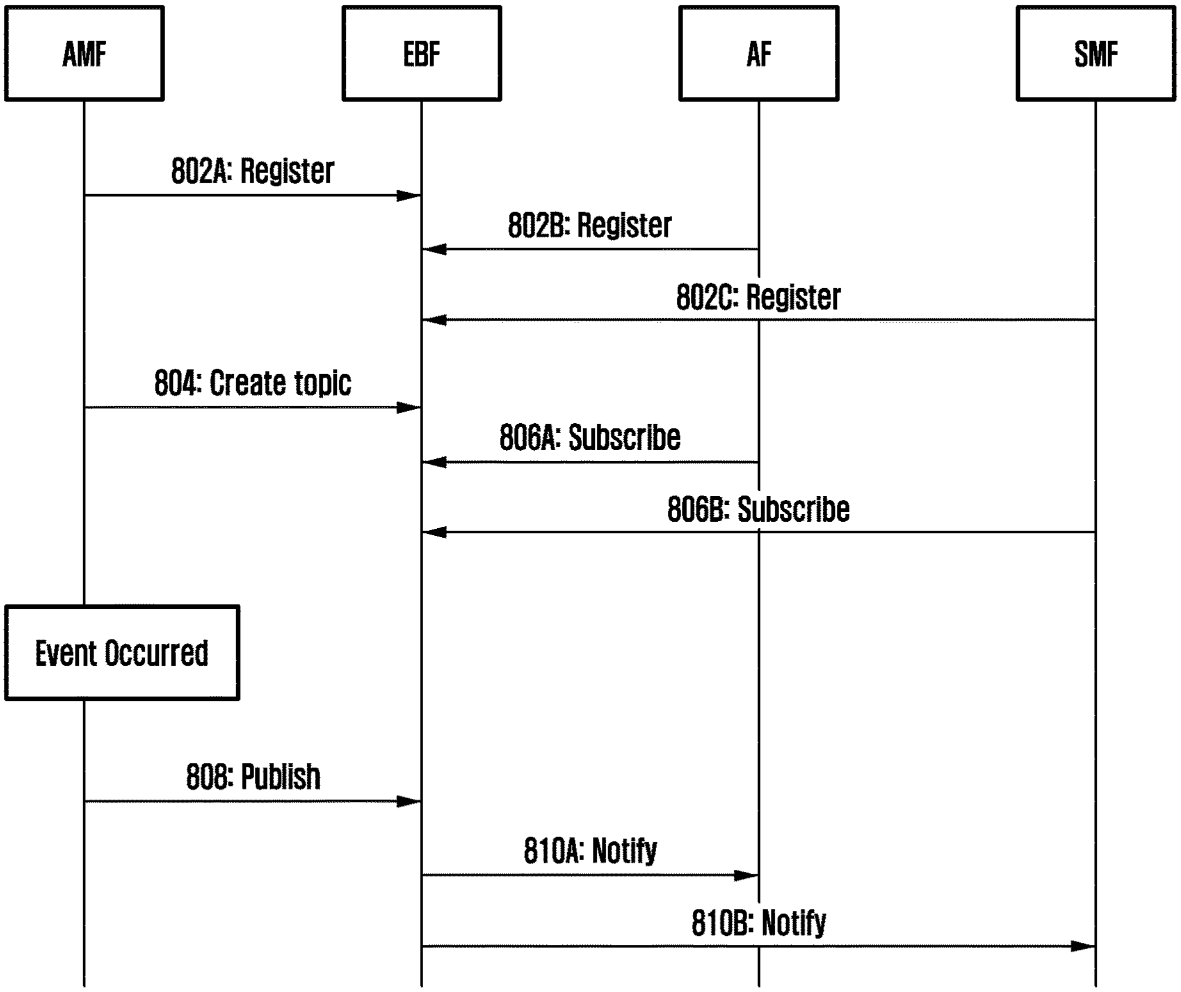
FIG. 8 illustrates a flow diagram for event handling in a service-based communication architecture according to an embodiment of the disclosure.

FIG. 8 illustrates a flow diagram for event handling in a service-based communication architecture according to an embodiment of the disclosure. Details on the system 300 for event handling in the service-based communication architecture have been explained with reference to FIG. 4.

Referring to FIG. 8, at operations 802A, 802B, and 802C, multiple network functions (such as AMF, EBF, application function (AF), and SMF) are required to register with the EBF. This is a one-time registration. The network functions may have to re-register if the timer expires or communication address of NF changes. At operation 804, the producer network function may create topics based on domain. At operation 804, AMF creates mobility-related topics in the EBF. Further, at operations 806A and 806B, the multiple network functions may create subscriptions to the published topics, such as mobility topic. Whenever any event occurs related to this topic, the network function may publish the event to the EBF, at operation 808. The publisher network function does not know which network functions have subscribed to the event. At operation 810A and 810B, the EBF informs the network functions about the occurred event based on the list of subscribed NFs for the topic. The EBF may retry if a network function is not available.

Figure 9:
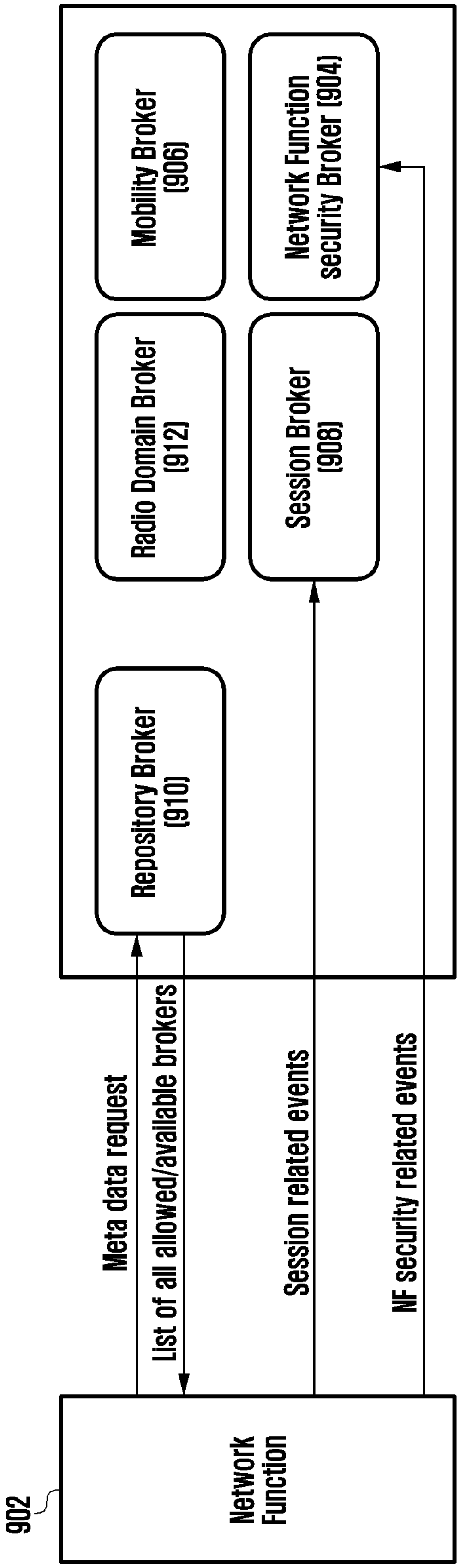
FIG. 9 illustrates a block diagram depicting an architecture of a network function for event handling in a service-based communication architecture according to an embodiment of the disclosure.

FIG. 9 illustrates a block diagram depicting an architecture of a network function for event handling in a service-based communication architecture according to an embodiment of the disclosure. Details on the system 300 for event handling in the service-based communication architecture have been explained with reference to FIG. 4.

Referring to FIG. 9, in the current 5G architecture, all network function events are exposed through single an "EventExposure" endpoint per network function. If system 300 wide information is required, multiple network functions are required to be contacted for generating such inference, e.g., at any point if a user wants all the security related events, the user may need to poll the event exposure API of all the network functions present. However, the network function 902 i.e., EBF captures all domain related information in single place by a network function security broker 904. The security related events are accessed by using the network function security broker 904. This kind of segregation allows the network function 902 to generate topics which the network function 902 is enabled for and discards rest of the internal raised events. For example, a consumer can subscribe to a mobility broker 906 for all the mobility related events (like UE location change, handover, and the like), or the consumer can subscribe to a session broker 908 for session related events. The network function 902 can create topics using a create topic command to create multiple topics. The network function may share the meta-data request to a repository broker 910 and extract the list of all the available brokers. In an embodiment of the disclosure, a radio domain broker 912. (i.e., topic (separate logical channel) under the event broker) handles all the events related to radio, such as radio link failures and change in radio connection of UEs. These topics help subscriber to subscribe to only particular types of events.

Figure 10A:
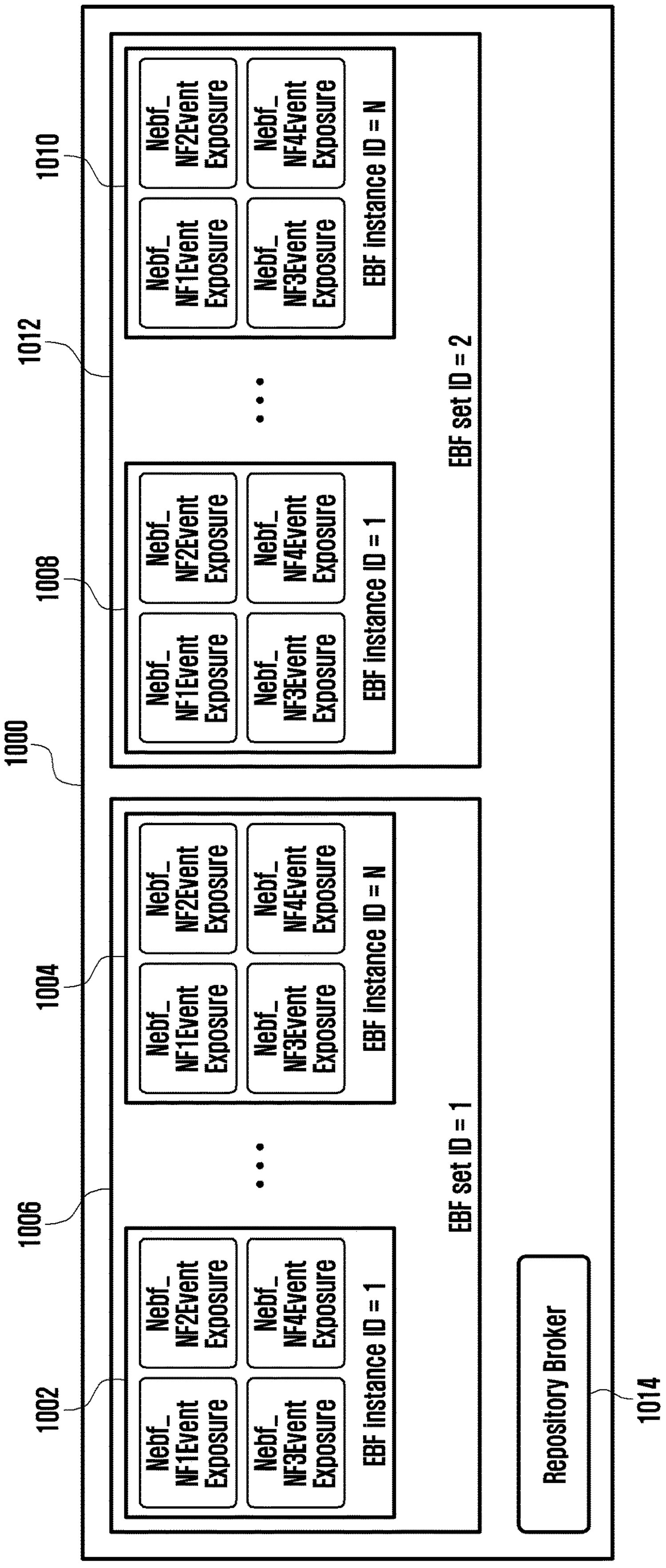
FIG. 10A illustrates a block diagram depicting an architecture of an EBF according to an embodiment of the disclosure.
Figure 10B:
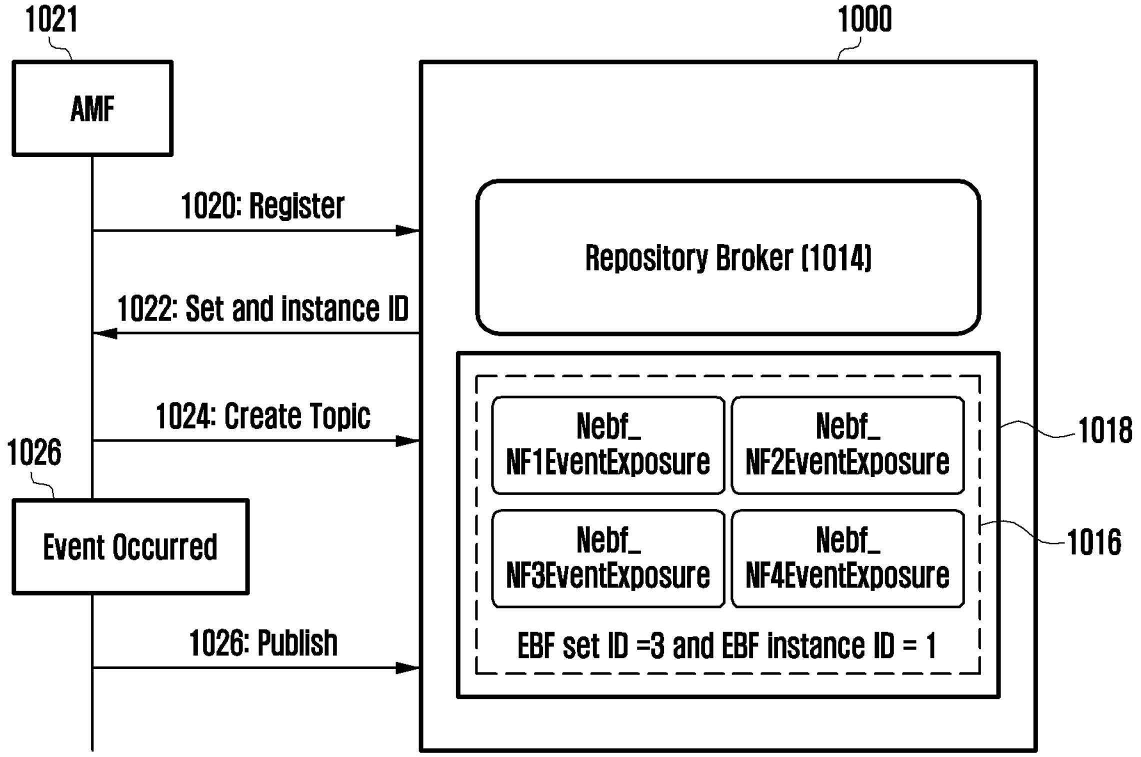
FIG. 10B illustrates a flow diagram showing a selection criterion of an EBF set and an instance Identity (ID) by a repository broker service according to an embodiment of the disclosure.

FIG. 10A illustrates a block diagram depicting an architecture of an EBF according to an embodiment of the disclosure. FIG. 10B illustrates a flow diagram showing a selection criterion of an EBF set and an instance ID by a repository broker service according to an embodiment of the disclosure. For the sake of brevity, FIGS. 10A and 10B are explained together. As explained in FIG. 4, the network entity set is associated with the network entity. In an embodiment of the disclosure, the EBF is a type of the network entity. Similarly, the EBF set is associated with the EBF.

Referring to FIGS. 10A and 10B, when a centralized EBF is created to handle events, there is a risk of availability and likelihood to lose the data stored in the EBF, if the EBF goes down. As shown in diagram below, the design of an EBF 1000 may consist cluster of multiple EBF set and each set consist of multiple instances. All the instances under an EBF set maintains same set of event data that the network function subscribes, publishes and consumes the event. For example, FIG. 10A shows an EBF instance ID 1 (represented by 1002) and an EBF instance ID N (represented by 1004) of an EBF set ID 1 (represented by 1006). Similarly, FIG. 10A also shows an EBF instance ID 1 (represented by 1008) and an EBF instance ID N (represented by 1010) of an EBF set ID 2 (represented by 1012). In an embodiment of the disclosure, a repository broker 1014 is a micro service in a logical event broker function.

Further, FIG. 10B also shows an EBF instance ID 1 (represented by 1016) of an EBF set ID 3 (represented by 1018) associated with the EBF 1000. At operation 1020, the producer network function i.e., AMF 1021 sends its instance ID, slice type and release version information in registration message to the repository broker 1014 of the EBF 1000. Based on the operator configuration, provided slice information, and local event load at each EBF set, the repository broker 1014 selects the least loaded and available event broker. The EBF 1000 provides the least loaded and available event broker's set and instance ID to the AMF 1021, at operation 1022. In an embodiment of the disclosure, the response may also include FQDN/IP address of the EBF where the events are required to be sent. The AMF 1021 also includes the EBF set and instance ID that it has received from the repository broker 1014 in the event header for better event handling. At operation 1024, the AMF 1021 creates topic. The AMF 1021 can create a single topic or multiple topics based on the events that the AMF 1021 is producing. For example, the AMF 1021 can create mobility and access related topics in the event broker. At operation 1026, when the event occurs and AMF 1021 is informed about it, the AMF 1021 publishes the event in the respective topic. Further, at operation 1028, the AMF 1021 starts sending the events to the EBF instance directly. In case if the EBF 1000 goes down, the repository broker 1014 selects the next best available EBF and assigns the next best available EBF's instance ID and FQDN/IP to the EBF 1000. With the help of the repository broker 1014, the EBF set and instance ID, a highly available logical EBF NF can be achieved to handle events.

Figure 11:
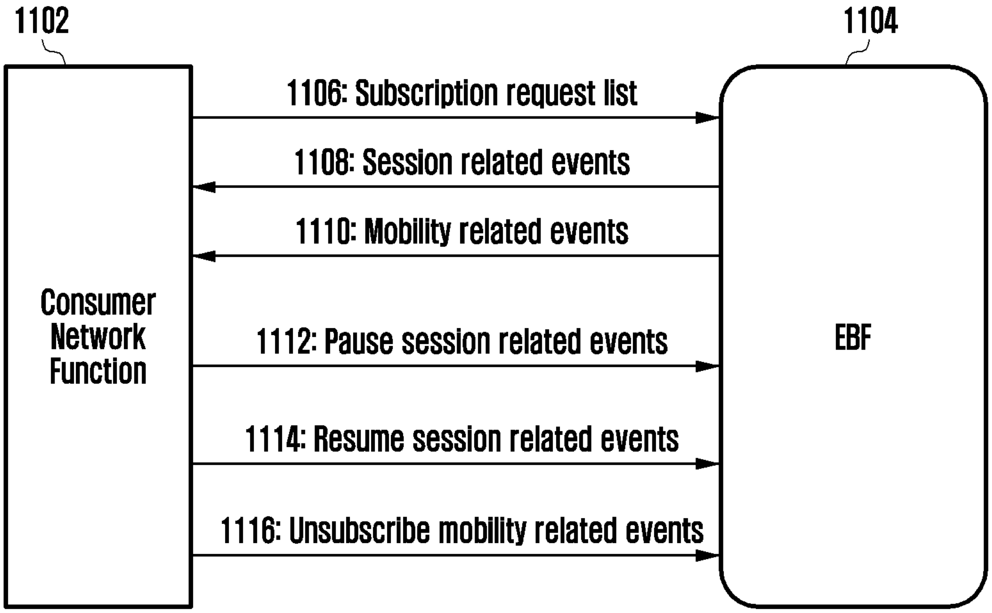
FIG. 11 illustrates a flow diagram showing an execution of a session operation according to an embodiment of the disclosure.

FIG. 11 illustrates a flow diagram showing an execution of a session operation according to an embodiment of the disclosure. Details on the execution of the session operation have been explained with reference to FIG. 4.

Referring to FIG. 11, in an embodiment of the disclosure, asynchronous message transfer is performed by EventExposure API of a consumer network function 1102 where a peer network function subscribes for a particular event and receives a notification when that event occurs. But for many events (such as protocol data unit (PDU) session changes or UE location changes), there can be multiple events. If a next generation node B (gNB) or the consumer network function 1102 goes down or if the subscribed NF is overloaded, it is impossible to pause such non-critical events in the system 300 of the related art. However, the system 300 discloses a call flow (as shown in the figure) where the peer network function has an option to pause or resume a particular event topic though the consumer network function 1102 had subscribed for it. This call flow helps in situations like network function overload or backup/restore, or the like. With EBF 1104, sudden network function node failure or signaling storms may not affect the asynchronous message at the consumer network function 1102 since the work of event tracking is delegated to the EBF 1104.

At operation 1106, the consumer network function 1102 shares the subscription request list with the EBF 1104. Further, at operation 1108, the EBF 1104 shares the session-related events with the consumer network function 1102. At operation 1110, the EBF 1104 shares the mobility-related events with the consumer network function 1102. At operation 1112, the consumer network function 1102 pauses session-related events. Furthermore, at operation 1114, the consumer network function 1102 resumes session-related events. At operation 1116, the consumer network function 1102 unsubscribe mobility-related events.

Figure 12:
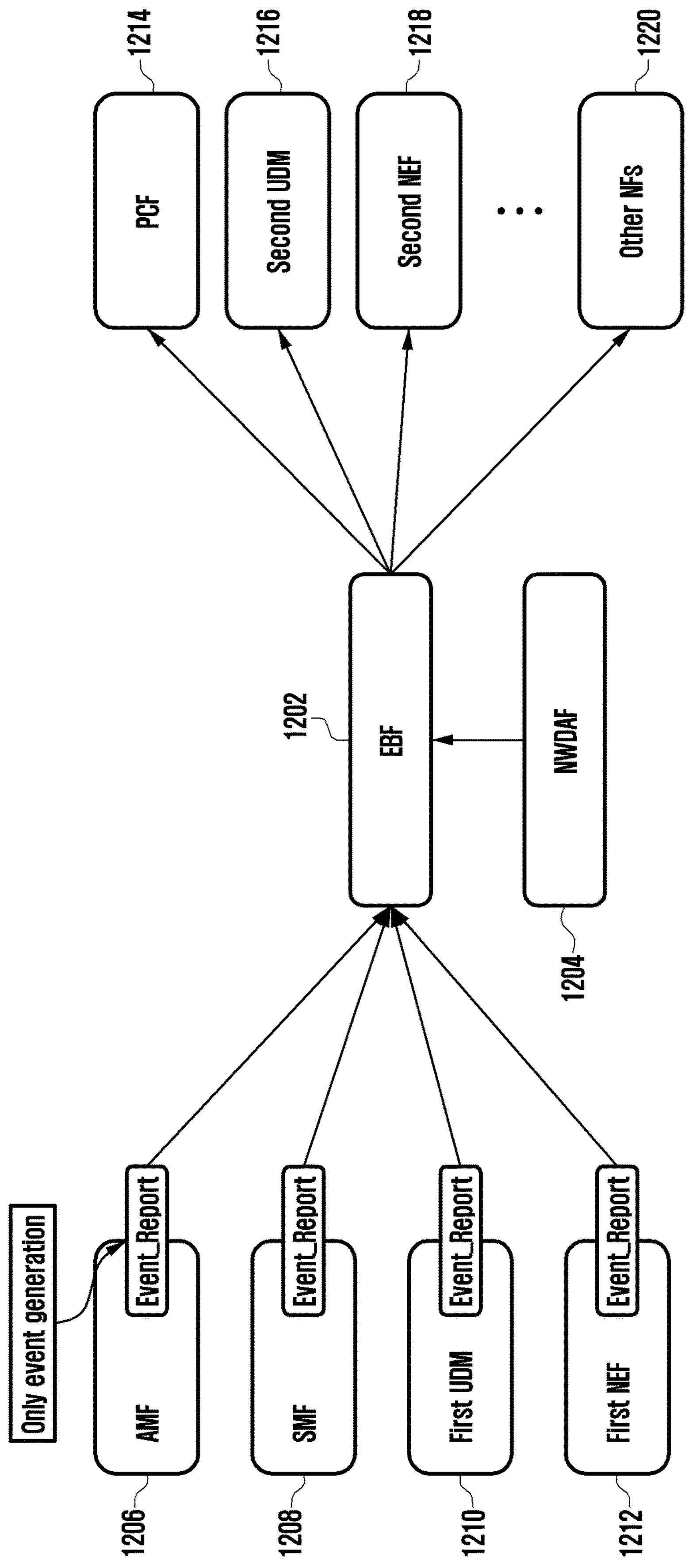
FIG. 12 illustrates a block diagram depicting storage of a set of events in a repository according to an embodiment of the disclosure.

FIG. 12 illustrates a block diagram depicting a storage of a set of events in the repository according to an embodiment of the disclosure. Details on the storage of the set of events in the repository have been explained with reference to FIG. 4.

Referring to FIG. 12, in the current 5G core network architecture, asynchronous messages or events are not stored in a common place for later historical processing. This makes any analytical or AI/ML related analytics difficult as each event is present in a separate network function. However, the disclosure, allows the events of the system 300 to be stored in the repository of the EBF 1202. For example, the repository may be network data and analytics function (NWDAF) 1204. The AMF 1206, the SMF 1208, the first UDM 1210, the first NEF 1212, the NWDAF 1204, the PCF 1214, the second UDM 1216, the second NEF 1218, and other NFs 1220 of FIG. 12 are equivalent to the AMF 504, the SMF 506, the first UDM 508, the first NEF 510, the PCF 512, the AUSF 513, the second NEF 516, and the other NFs 518 of FIGS. 5A, 5B, and 5C.

Figure 13:
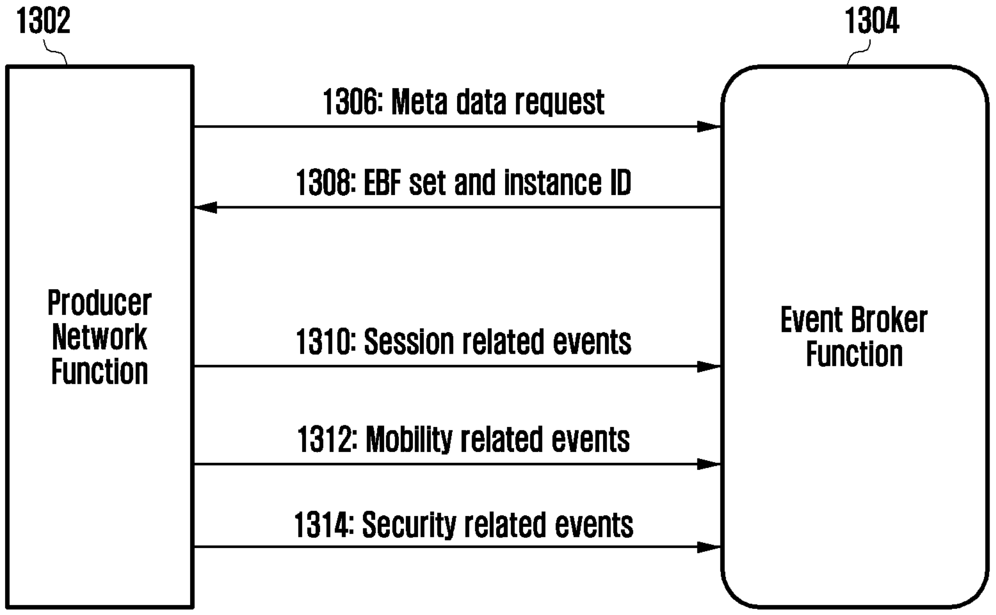
FIG. 13 illustrates a flow diagram for receiving one or more required events from one or more publisher network functions according to an embodiment of the disclosure.

FIG. 13 illustrates a flow diagram for receiving one or more required events from one or more publisher network functions according to an embodiment of the disclosure.

Referring to FIG. 13, it shows a metadata based request/response communication between the producer network function 1302 and the EBF 1304. At operation 1306, a producer network function 1302 initially sends a metadata request to the EBF 1304 based on the network function settings and configuration at the EBF 1304 added by the operator or a software vendor. In an embodiment of the disclosure, the EBF determines the events that the producer network function 1302 are required to generate in the response to the metadata request. Further, at operation 1308, the EBF 1304 sends the EBF set and instance ID to the producer network function 1302. After parsing the metadata request, the producer network function 1302 may start to generate events for a set of enabled events and not for all events that may occur at the producer network function's EBF 1304 end. For example, at operation 1310, the producer network function 1302 shares the session-related events with the EBF 1304. At operation 1312, the producer network function 1302 shares the mobility-related events with the EBF 1304. Further, at operation 1314, the producer network function 1302 shares the security-related events with the EBF 1304.

Figure 14:
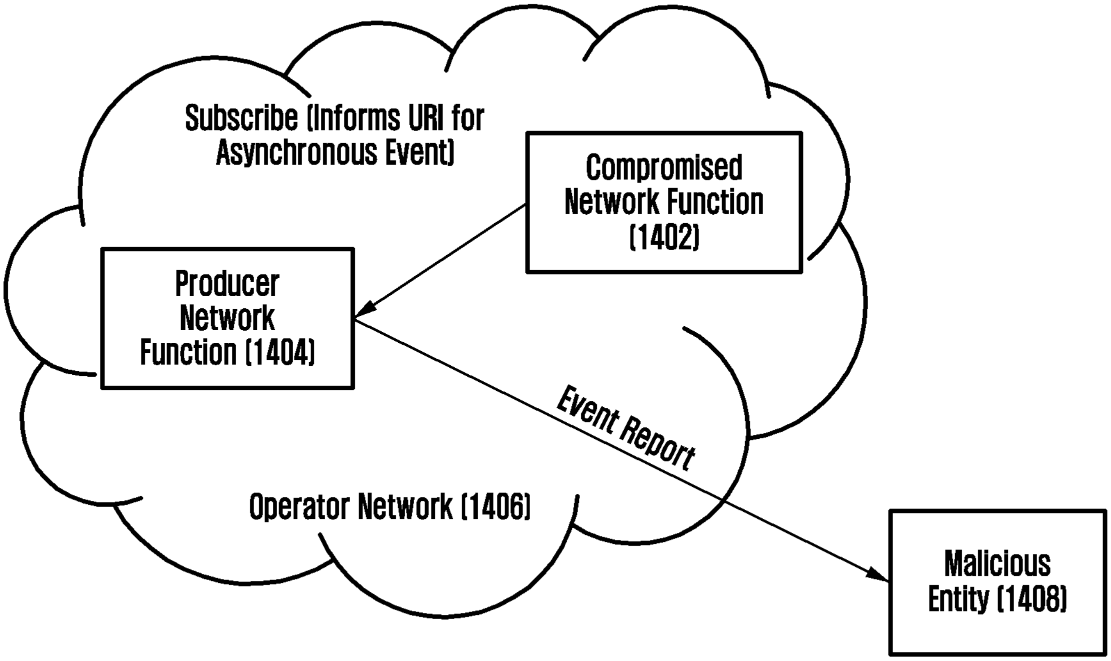
FIG. 14 illustrates a schematic representation depicting a use-case scenario of a system for improving a security of a network function according to an embodiment of the disclosure.

FIG. 14 illustrates a schematic representation depicting a use-case scenario of a system for improving a security of a network function according to an embodiment of the disclosure. Details on the system 300 for receiving the one or more required events for event handling in the service-based communication architecture have been explained with reference to FIG. 4.

Referring to FIG. 14, in solutions of the related art, asynchronous message or events are designed using a legacy web subscribe-notify mechanism. For example, a subscriber network function may supply the callback uniform resource identifier (URI) to which the events are required to be sent. Currently, the network function uses a callback URI to deliver an asynchronous message to a consumer network function. Further, a compromised network function 1402 may trick a producer network function 1404 to send an event to URI outside an operator network 1406. The compromised network function 1402 may insert an unauthorized URI which may belong to the malicious and a third-party network function (shown as malicious entity 1408). As a result, it may lead to security vulnerabilities. Thus, it is very difficult to authorize the URI due to the dynamic nature of IP address allocation.

However, in the disclosure, the event broker function does not use callback URI to send the event to the consumer network function. The event broker function uses the same ID to send the event that the consumer network function used to subscribe the event. Thus, no callback URI is used, and hence malicious URI is avoided.

Figure 15:
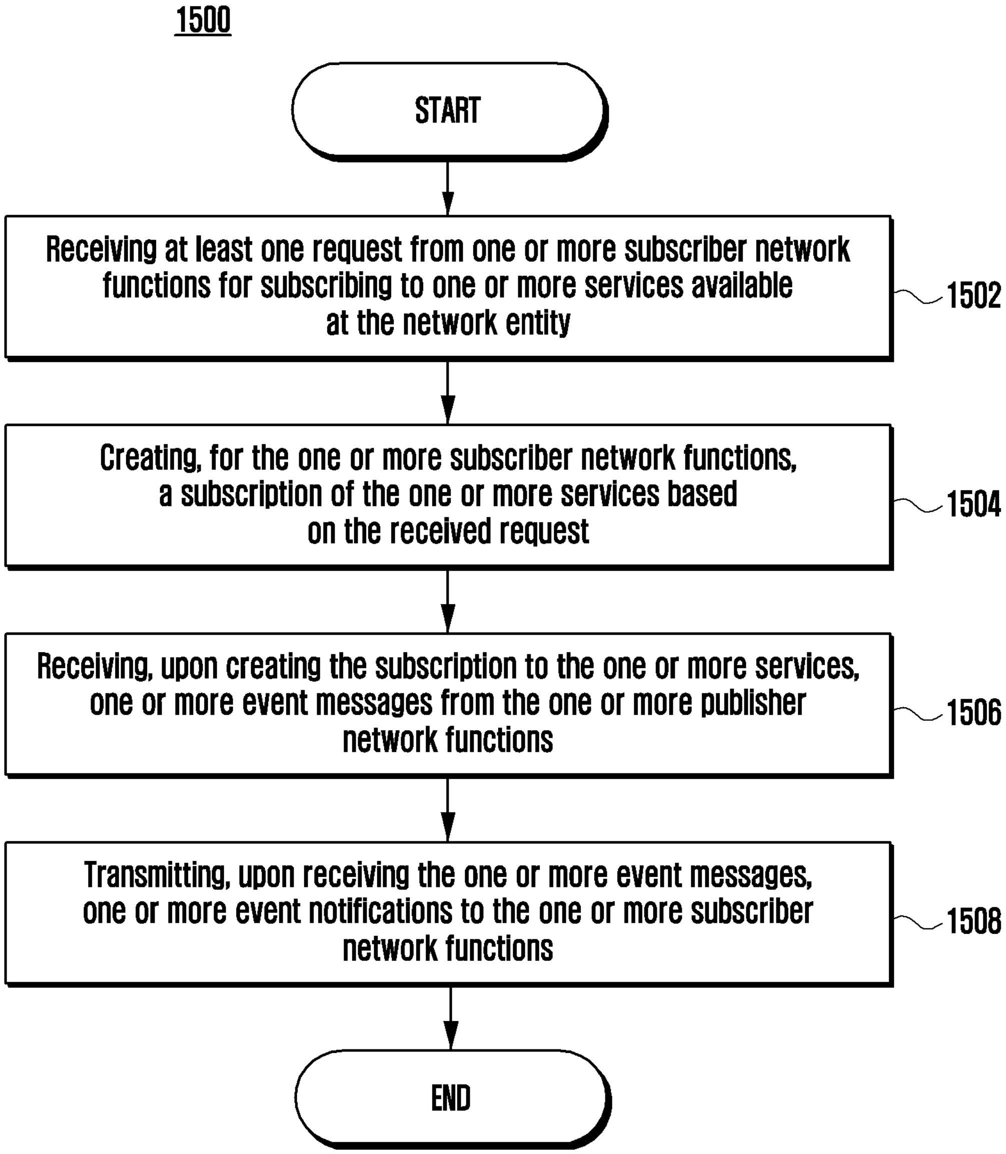
FIG. 15 illustrates a process flow depicting a method for event handling in a service-based communication architecture according to an embodiment of the disclosure.

FIG. 15 illustrates a process flow depicting a method for event handling in a service-based communication architecture according to an embodiment of the disclosure.

Referring to FIG. 15, a method 1500 may be performed by a system 300 implemented in the core network 302, as shown in FIGS. 3 and 4.

At operation 1502, the method 1500 includes receiving at least one request from one or more subscriber network functions for subscribing to one or more services available at the network entity, wherein the one or more services are created by one or more publisher network functions. In an embodiment of the disclosure, the network entity is a network function, an entity located in a service communication proxy (SCP) network function, located in a network function of a service-based communication network, or any combination thereof.

Further, at operation 1504, the method 1500 includes creating, for the one or more subscriber network functions, a subscription of the one or more services based on the received request.

The method 1500 at operation 1506 further includes receiving, upon creating the subscription to the one or more services, one or more event messages from the one or more publisher network functions, wherein the one or more event messages represent an occurrence of an event associated with the one or more services.

Further, at operation 1508, the method 1500 includes transmitting, upon receiving the one or more event messages, one or more event notifications to the one or more subscriber network functions, wherein the one or more event notifications notify the one or more subscriber network functions about the occurrence of the event associated with the one or more services.

While the above operations shown in FIG. 15 are described in a particular sequence, the operations may occur in variations to the sequence in accordance with various embodiments of the disclosure. Further, the details related to various operations of FIG. 15, which are already covered in the description related to FIGS. 1 to 4, 5A to 5C, 6A to 6C, 7A, 7B, 8, 9, 10A, 10B, and 11 to 14 are not discussed again here for the sake of brevity.

The disclosure provides for various technical advancements based on the key features discussed above. The disclosure simplifies the current network function design by removing an event exposure service. Further, in the disclosure, the domain driven design of the event broker function enables easier access of all the events related to a domain. The disclosure ensures that the network functions may be served by some EBF. Furthermore, the disclosure discloses the feature to pause or resume event subscription in case of network overload. Further, the event data functionality stores data of all past events to enable network analytics. The disclosure discloses a message sequence for accessing the metadata stored in the EBF. Furthermore, the disclosure improves the security mechanisms in EBF.

The plurality of modules 308 may be implemented by any suitable hardware and/or set of instructions. Further, the sequential flow illustrated in FIG. 3 is in nature and the embodiments may include the addition/omission of operations as per the requirement. In some embodiments of the disclosure, one or more operations performed by the plurality of modules 308 may be performed by the processor/controller based on the requirement.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network entity for event handling in a service-based communication network, the method comprising:
- receiving, from at least one first entity implementing a subscriber network function, at least one request for subscribing to at least one service available at the network entity, wherein the at least one service is created by at least one second entity implementing a publisher network function;
- creating, for the at least one first entity, a subscription of the at least one service based on the at least one request;
- receiving, from the at least one second entity, an event message based on the subscription, the event message indicating an occurrence of an event associated with the at least one service;
- transmitting, to the at least one first entity, at least one event notification indicating the occurrence of the event based on the event message;
- storing, in a repository of the network entity, a set of events including events associated with the subscription of the at least one service and the at least one event notification; and
- providing, to at least one third entity implementing a network analytics function, access to the stored set of events for analytics operations.

2. The method of claim 1,
- wherein the network entity is at least one of a network function, an entity located in a service communication proxy (SCP) network function, or an entity located in a network function of the service-based communication network.

3. The method of claim 1, further comprising, prior to receiving the at least one request:
- receiving a registration request from the at least one first entity and the at least one second entity; and
- registering the at least one first entity and the at least one second entity based on the received registration request.

4. The method of claim 1, further comprising:
- receiving a set of control plane messages from the at least one second entity;
- generating a set of producer events based on the received set of control plane messages; and
- transmitting the generated set of producer events to the at least one first entity that has subscribed to the set of producer events,
- wherein the set of events further includes events corresponding to unsubscribing from the at least one service, pausing the subscription of the at least one service, and resuming the subscription of the at least one service.

5. The method of claim 1, further comprising:
- receiving, from the at least one second entity, at least one message associated with at least one of mobility, security, or a session; and
- performing at least one operation based on a type of the at least one received message, wherein the at least one operation comprises at least one of creating, deleting, or modifying a grouping of events.

6. The method of claim 1, further comprising:
- receiving, from the at least one first entity, a request for obtaining a subscription list;
- transmitting, to the at least one first entity, a set of session-related events and a set of mobility-related events based on the received request;
- receiving, from the at least one first entity, a session request to perform a session operation, wherein the session operation is one of pausing the session-related events, resuming the session-related events, or unsubscribing from the mobility-related events;
- performing the session operation based on a type of the session request;
- receiving, from the at least one second entity, a metadata request, wherein the metadata request is based on network function settings and a network entity configuration;
- transmitting, to the at least one second entity, based on at least one required event, a network entity set and an instance identity (ID) associated with the network entity; and
- receiving, from the at least one second entity, the at least one required event comprising at least one of the session-related events, the mobility-related events, or network function-related events.

7. The method of claim 1, further comprising:
- receiving, from the at least one second entity, producer information in a registration message, wherein the producer information comprises an instance ID, a slice type, and release version information associated with the at least one second entity;
- determining a first optimal network entity set from a plurality of network entity sets and a first instance ID corresponding to the first optimal network entity set from a plurality of IDs based on at least one network parameter, wherein the at least one network parameter comprises operator information, slice information, a local event load at each of the plurality of network entity sets, and an availability status of each of the plurality of network entity sets;
- transmitting, to the at least one second entity, the first optimal network entity set and the first instance ID along with one of a fully qualified domain name (FQDN) or an Internet protocol (IP) address;
- receiving, from the at least one second entity, one or more events by using the first optimal network entity set, the first instance ID, and the one of the FQDN or the IP address;
- determining that the first optimal network entity set and the first instance ID are unavailable due to one or more errors;

determining a second optimal network entity set from the plurality of network entity sets and a second instance ID corresponding to the second optimal network entity set from the plurality of IDs based on the at least one network parameter;

transmitting, to the at least one second entity, the second optimal network entity set and the second instance ID along with one of the FQDN or the IP address; and receiving, from the at least one second entity, the one or more events by using the second optimal network entity set, the second instance ID, and the one of the FQDN or the IP address.

8. A network entity for event handling in a service-based communication network, the network entity comprising:

a memory storing one or more computer programs; and at least one processor communicatively coupled to the memory, wherein the one or more computer programs include instructions executable by the at least one processor individually or in any combination to cause the network entity to:

receive, from at least one first entity implementing a subscriber network function, at least one request for subscribing to at least one service available at the network entity, wherein the at least one service is created by at least one second entity implementing a publisher network function, create, for the at least one first entity, a subscription of the at least one service based on the at least one request, receive, from the at least one second entity, an event message based on the subscription, the event message indicating an occurrence of an event associated with the at least one service, transmit, to the at least one first entity, at least one event notification indicating the occurrence of the event based on the event message, store, in a repository of the network entity, a set of events including events associated with the subscription of the at least one service and the at least one event notification, and provide, to at least one third entity implementing a network analytics function, access to the stored set of events for analytics operations.

9. The network entity of claim 8, wherein the network entity is at least one of a network function, an entity located in a service communication proxy (SCP) network function, or an entity located in a network function of the service-based communication network.

10. The network entity of claim 8, wherein the instructions executable by the at least one processor individually or in any combination further cause the network entity to:

receive a registration request from the at least one first entity and the at least one second entity, and register the at least one first entity and the at least one second entity based on the received registration request.

11. The network entity of claim 8, wherein the instructions executable by the at least one processor individually or in any combination further cause the network entity to:

receive a set of control plane messages from the at least one second entity, generate a set of producer events based on the received set of control plane messages, and transmit the generated set of producer events to the at least one first entity that has subscribed to the set of producer events, wherein the set of events further includes events corresponding to unsubscribing from the at least one service, pausing the subscription of the at least one service, and resuming the subscription of the at least one service.

12. The network entity of claim 8, wherein the instructions executable by the at least one processor individually or in any combination further cause the network entity to:

receive, from the at least one second entity, at least one message associated with at least one of mobility, security, or a session, and perform at least one operation based on a type of the at least one received message, wherein the at least one operation comprises at least one of creating, deleting, or modifying a grouping of events.

13. The network entity of claim 8, wherein the instructions executable by the at least one processor individually or in any combination further cause the network entity to:

receive, from the at least one first entity, a request for obtaining a subscription list, transmit, to the at least one first entity, a set of session-related events and a set of mobility-related events based on the received request, receive, from the at least one first entity, a session request to perform a session operation, wherein the session operation is one of pausing the session-related events, resuming the session-related events, or unsubscribing from the mobility-related events, perform the session operation based on a type of the session request, receive, from the at least one second entity, a metadata request, wherein the metadata request is based on network function settings and a network entity configuration, transmit, to the at least one second entity, based on at least one required event, a network entity set and an instance identity (ID) associated with the network entity, and receive, from the at least one second entity, the at least one required event comprising at least one of the session-related events, the mobility-related events, or network function-related events.

14. The network entity of claim 8, wherein the instructions executable by the at least one processor individually or in any combination further cause the network entity to:

receive, from the at least one second entity, producer information in a registration message, wherein the producer information comprises an instance ID, a slice type, and release version information associated with the at least one second entity, determine a first optimal network entity set from a plurality of network entity sets and a first instance ID corresponding to the first optimal network entity set from a plurality of IDs based on at least one network parameter, wherein the at least one network parameter comprises operator information, slice information, a local event load at each of the plurality of network entity sets, and an availability status of each of the plurality of network entity sets, transmit, to the at least one second entity, the first optimal network entity set and the first instance ID along with one of a fully qualified domain name (FQDN) or an Internet protocol (IP) address, and receive, from the at least one second entity, one or more events by using the first optimal network entity set, the first instance ID, and the one of the FQDN or the IP address.

15. The network entity of claim 14, wherein the instructions executable by the at least one processor individually or in any combination further cause the network entity to:

determine that the first optimal network entity set and the first instance ID are unavailable due to one or more errors, determine a second optimal network entity set from the plurality of network entity sets and a second instance ID corresponding to the second optimal network entity set from the plurality of IDs based on the at least one network parameter, transmit, to the at least one second entity, the second optimal network entity set and the second instance ID along with one of the FQDN or the IP address, and receive, from the at least one second entity, the one or more events by using the second optimal network entity set, the second instance ID, and the one of the FQDN or the IP address.

* * * * *